(12) United States Patent
Folkmanis et al.

(10) Patent No.: US 9,306,742 B1
(45) Date of Patent: Apr. 5, 2016

(54) COMMUNICATING A SECRET

(71) Applicant: Google Inc., Mountain View, CA (US)

(72) Inventors: Girts Folkmanis, San Francisco, CA (US); Paul Heninwolf, San Carlos, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/759,267

(22) Filed: Feb. 5, 2013

(51) Int. Cl.
*H04L 29/06* (2006.01)
*H04L 9/08* (2006.01)

(52) U.S. Cl.
CPC .................................. *H04L 9/0861* (2013.01)

(58) Field of Classification Search
CPC ......... H04L 9/00; H04L 63/00; H04L 63/045; H04L 63/061; H04L 63/062; H04L 9/0861; H04W 12/00
See application file for complete search history.

(56) References Cited

U.S. PATENT DOCUMENTS

| | | | | |
|---|---|---|---|---|
| 5,214,698 A | * | 5/1993 | Smith et al. | 380/280 |
| 5,483,595 A | * | 1/1996 | Owen | 380/271 |
| 7,260,714 B2 | | 8/2007 | Dawson et al. | |
| 7,891,557 B2 | * | 2/2011 | Brown et al. | 235/380 |
| 7,933,413 B2 | | 4/2011 | Steeves et al. | |
| 8,078,873 B2 | | 12/2011 | Shah et al. | |
| 2009/0106550 A1 | * | 4/2009 | Mohamed | 713/156 |
| 2009/0113294 A1 | * | 4/2009 | Sanghavi et al. | 715/269 |
| 2009/0167486 A1 | | 7/2009 | Shah et al. | |
| 2010/0131759 A1 | * | 5/2010 | Pintsov | 713/168 |
| 2010/0228973 A1 | * | 9/2010 | Dancer et al. | 713/168 |
| 2011/0296508 A1 | * | 12/2011 | Os et al. | 726/7 |
| 2012/0045059 A1 | * | 2/2012 | Fujinami | 380/273 |
| 2013/0019096 A1 | * | 1/2013 | Palzer et al. | 713/168 |
| 2013/0086465 A1 | * | 4/2013 | Boudville | 715/234 |

* cited by examiner

*Primary Examiner* — Chau Le
*Assistant Examiner* — Muhammad Chaudhry
(74) *Attorney, Agent, or Firm* — Morris & Kamlay LLP

(57) ABSTRACT

A first portion of a cryptographic key can be conveyed through a secure channel to a device that can interact with a home network. After the first portion is received, a prompt can be sent by the recipient of the portion through a non-secure channel to the sender of the portion to send a second portion of the key. The cryptographic key can be constituted from the received portions and used by the device to secure communications with home network.

9 Claims, 3 Drawing Sheets

COMMUNICATING A SECRET

BACKGROUND

In systems such as home automation networks, devices (nodes) can communicate with each other using a networking protocol. For security and privacy reasons, this communication is often encrypted. When individual devices in the network do not have sufficiently powerful processors or large enough memory capacities, certain cryptographic protocols cannot be used. For example, in some home automation networks, it may be impractical to implement a processor-intensive cryptographic protocol, such as public key cryptography. Another method of securing communications can include symmetric keys and symmetric cryptographic protocols.

BRIEF SUMMARY

In an implementation, a portion of a cryptographic key can be sent over a secure channel. A command to display a second portion of the cryptographic key can be received over a non-secure channel after the first portion is sent by the sender or is received by the recipient. In response to the command, the second portion can be sent.

An implementation can include a memory for storing a cryptographic key having several portions. A processor in communication with the memory can send over a secure channel a first portion of the cryptographic key and receive over a non-secure channel a command to display a second portion of the key. The processor can send over the secure channel the second portion of the cryptographic key.

Additional features, advantages, and implementations of the disclosed subject matter may be set forth or apparent from consideration of the following detailed description, drawings, and claims. Moreover, it is to be understood that both the foregoing summary and the following detailed description are examples and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

To securely communicate a randomly chosen encryption key, a relatively simple network device may output an encryption key for a user to enter on another device to enable the device to securely communicate with entities on the network. For example, a simple device in a home automation network (such as an outlet control device, a network-capable speaker, etc.) may have a limited output display. For example, it may only be able to show one or two characters at a time. Such a simple device may also have no input methods, such as buttons or switches. In an implementation of the disclosed subject matter, an encryption key can be communicated from such a simple device to a user who can input the key information at another device (a user device) that has an input capability, such as a keypad. This can enable the user device to communicate securely with other devices on the network and/or use the encryption information in other ways. The cryptographic key material can be less vulnerable to electronic eavesdropping because it can be rendered to the user visually. The user can enter it into a user device.

Figure 1:
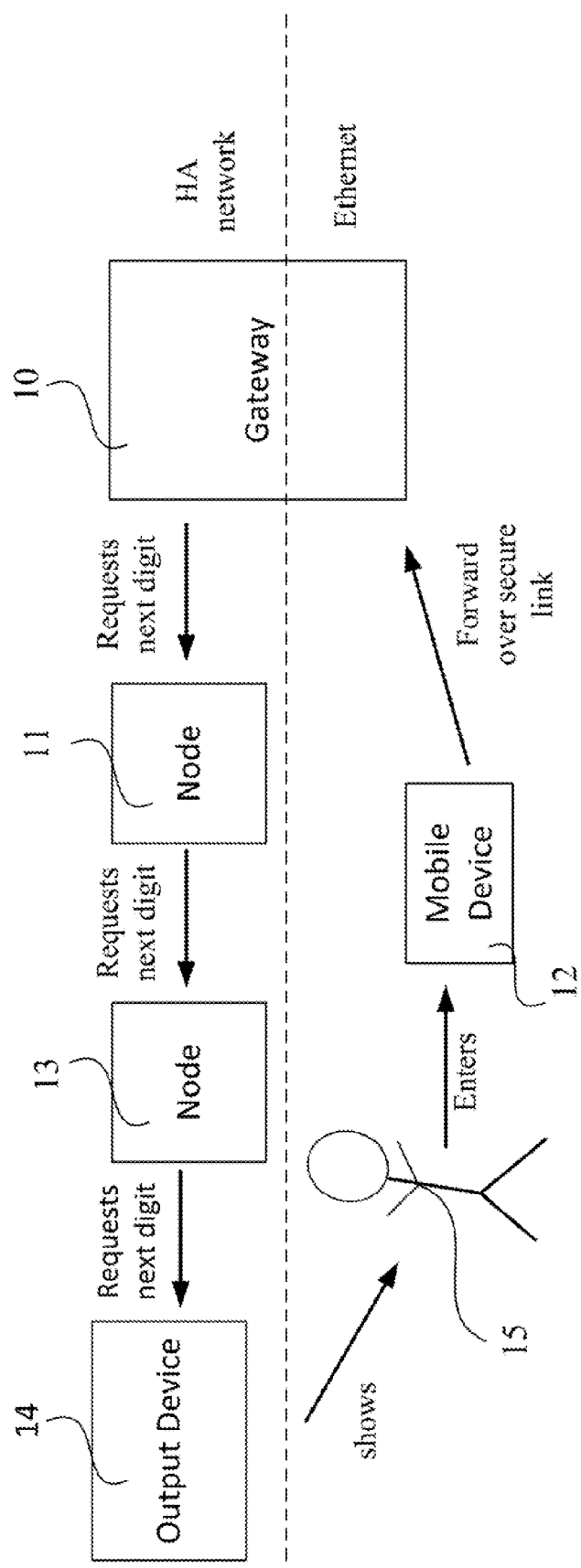
FIG. 1 shows a mesh network according to an implementation of the disclosed subject matter.

FIG. 1 shows an implementation of a home automation network on a mesh network in accordance with the presently disclosed subject matter. A gateway 10 can be in communication with a node 11 and a mobile device 12. A node can be a home automation device such as a light controller, a speaker controller, a motion sensor, etc. Node 11 can be in communication with another node 13, which can be in communication with an output device 14. Output device 14 can include a limited output display, such as a LCD screen that can only display one or two digits or alphanumeric characters at a time. The gateway 10, nodes 11 and 13 and output device 14 can communicate with each other over a home automation mesh network that may not be secure. The mobile device 12 may be a smartphone, a tablet, etc. that can have a secure connection to the gateway 10. A user 15 can receive codes (e.g., portions of cryptographic key material) by viewing the display on the output device 14. The user 15 can enter a received code into the mobile device 12 using a keypad, which can communicate the code to the gateway 10 over a secure link or communicate a command to send additional code information to the gateway 10. Upon receiving the code or command from the mobile device 12, the gateway 10 can send a command over a non-secure channel through the mesh network (e.g., via node 11) that can cause the output device 14 to display the next code to the user 15. This process can be repeated until the user 15 can receive (and can enter) all of the codes at the mobile device 12, where the codes can be stored or sent to the gateway 10. The codes can be used to generate cryptographic material that in turn can be used to secure communications between the mobile device 12 and one or more elements of the mesh network, such as the gateway 10 or else used in any other application that utilizes cryptographic key material. The cryptographic material can also be used to secure communications between elements of the mesh network, such as between nodes 11 and 13 and/or the gateway 10.

Figure 2:
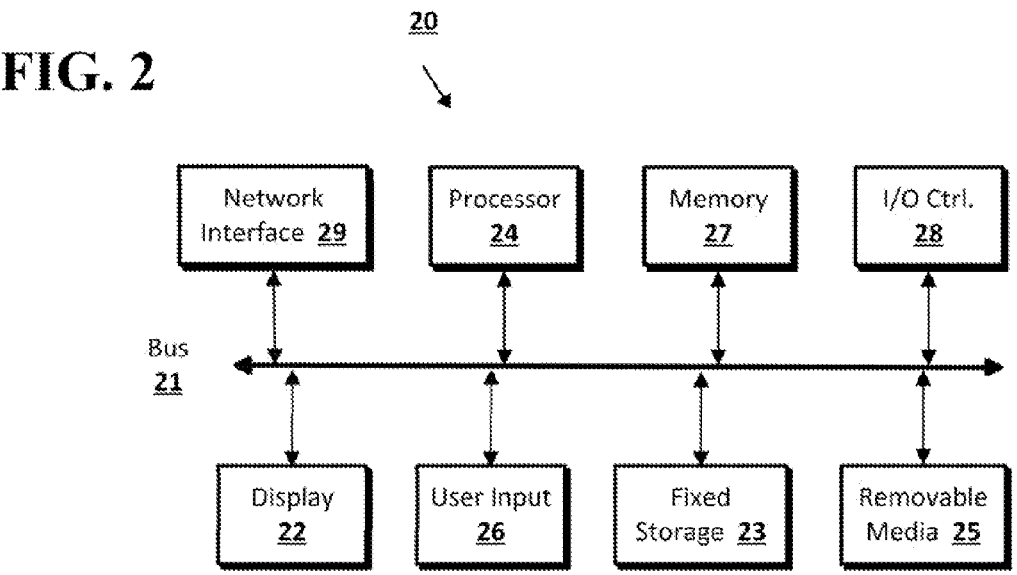
FIG. 2 shows a computer capable of implementing an example of the disclosed subject matter.

Implementations of the presently disclosed subject matter may be implemented in and used with a variety of component and network architectures. FIG. 2 is an example computer 20 suitable for implementing implementations of the presently disclosed subject matter and can be any element of the mesh network, such as a node, a gateway, an output device, etc., or a mobile device. The computer 20 can include some or all of the following: A bus 21 which interconnects major components of the computer 20, such as a central processor 24, a memory 27 (typically RAM, but which may also include ROM, flash RAM, or the like), an input/output controller 28, a limited output user display 22, such as a display screen via a display adapter. Some elements of the network may include a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like. Some elements of the network may include input/output controller 28. Input/output controller 28 may be used by a node in an implementation of a home automation network to control an external device (not shown), such as a light, a speaker, an appliance, etc. In various implementations, it may also be able to detect a gesture, detect motion, process input received from a user, etc.

The bus 21 allows data communication between the central processor 24 and the memory 27, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) that controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25.

Figure 3:
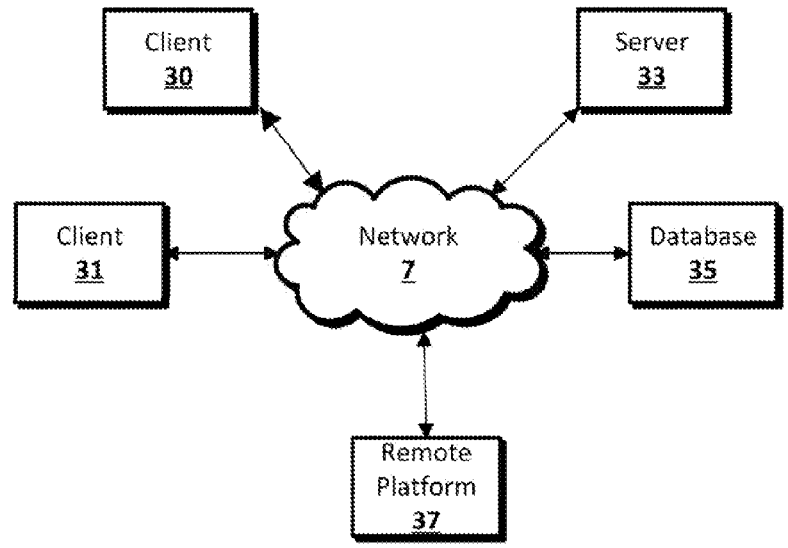
FIG. 3 shows a client/server network according to an implementation of the disclosed subject matter.

The fixed storage 23 may be integral with the computer 20 or may be separate and accessed through other interfaces. A network interface 29 may provide a direct connection to a mesh network such as a home automation network, to a remote server, to the Internet via an Internet service provider (ISP), etc. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 3.

Many other devices or components (not shown) may be connected in a similar manner (e.g., document scanners, digital cameras and so on). Conversely, all of the components shown in FIG. 2 need not be present to practice the disclosed subject matter. The components can be interconnected in different ways from that shown. The operation of a computer such as that shown in FIG. 2 is readily known in the art and is not discussed in detail in this application. Code to implement the present disclosure can be stored in computer-readable storage media such as one or more of the memory 27, fixed storage 23, removable media 25, or on a remote storage location.

Although FIG. 1 shows an implementation of the disclosed subject matter in a mesh network, there may also be client/server network implementations in accordance with the disclosed subject matter. FIG. 3 shows an example network arrangement according to such an implementation. One or more clients 30, 31, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 33 and/or databases 35. The devices may be directly accessible by the clients 30, 31, or one or more other devices may provide intermediary access such as where a server 33 provides access to resources stored in a database 35. The clients 30, 31 also may access remote platforms 37 or services provided by remote platforms 37 such as cloud computing arrangements and services. The remote platform 37 may include one or more servers 33 and/or databases 35. In accordance with an implementation, client 30 may be a limited output display device and client 31 may be a mobile device. Remote platform 37 may be a remote gateway controller that controls devices on numerous other networks and subnetworks (not shown.) Remote platform 37 may be in communication with at least one server 33 and a database 35. Remote platform 37 may cause limited output display device client 30 to display a code that can be entered at mobile device client 31 by a user (not shown.) When the code has been entered, the remote platform can cause another code to be shown by client 30, which can be entered by the user at client 31. The entered codes can be used as cryptographic material to secure communications between client 31 and other elements in communication with network 7, such as remote platform 37.

More generally, various implementations of the presently disclosed subject matter may include or be embodied in the form of computer-implemented processes and apparatuses for practicing those processes. Implementations also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that embodies all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

Figure 4:
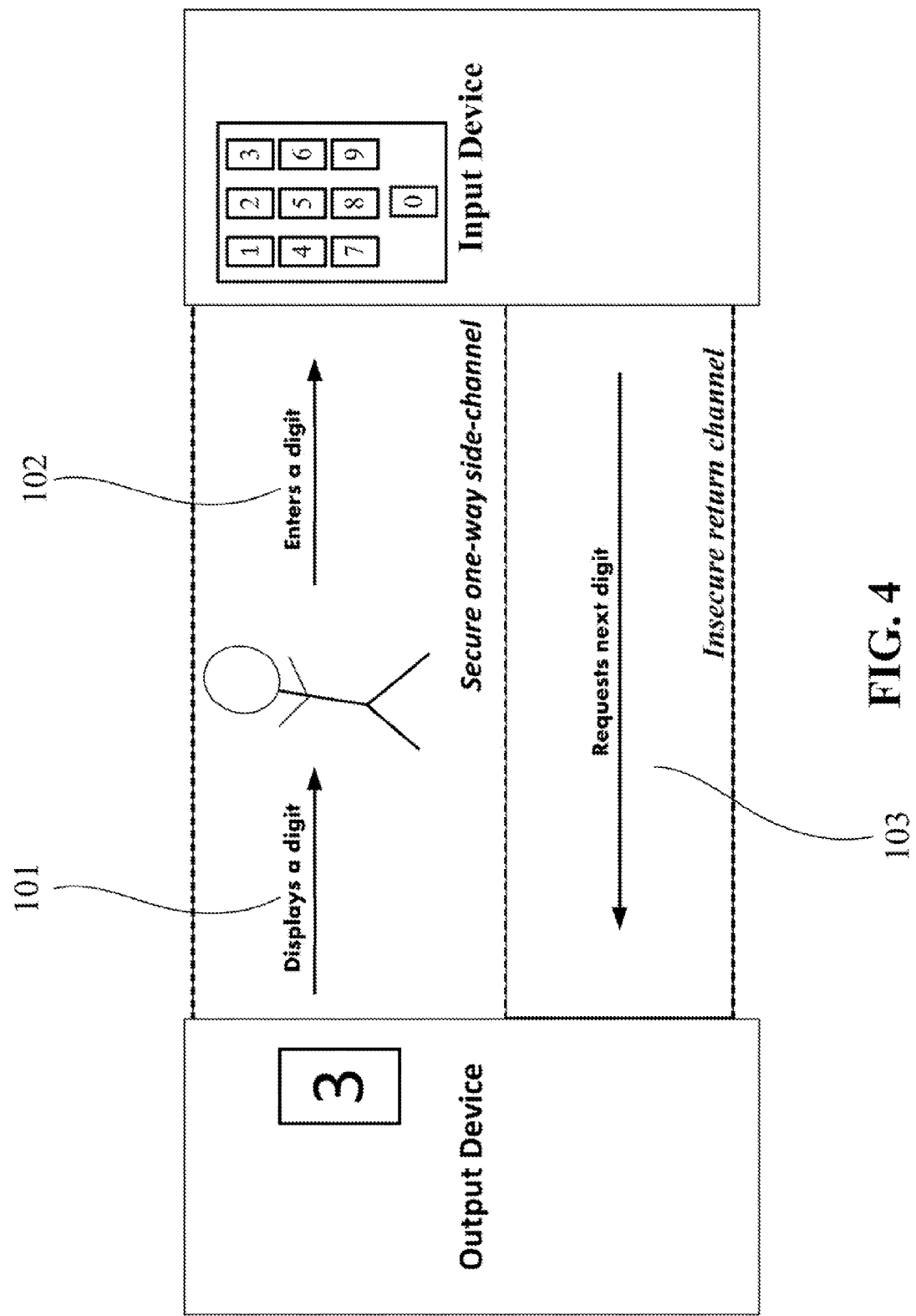
FIG. 4 shows a method in accordance with an implementation of the disclosed subject matter.

FIG. 4 shows an implementation in accordance with the disclosed subject matter. A limited output display device can show a digit via a secure one-way side channel, step 101. For example, the device can display a digit that is only visible at that time to a user of a mobile device having an input device. The user can enter the digit at the mobile device using the input device, step 102. The mobile device can generate a command to prompt the next digit and can send it via an insecure (i.e., non-secure) return channel to the output device, step 103. An example of a non-secure return channel can be an unencrypted mesh network communications link, an unsecured Bluetooth link, an unsecured WiFi link, an unsecured Ethernet link, etc. The command may generate the next digit by being sent directly to the output device or to another device (such as a gateway) that can cause the command to be propagated to the output device.

In accordance with implementations of the disclosed subject matter, a cryptographic key having two or more portions can be provided. The implementation can generate the key or receive the key from another entity, such as a server, a node on a mesh network, a device, etc. The cryptographic key can be a type that can be used in a symmetric (e.g., DES, AES, etc.) or an asymmetric cryptographic system, such as RSA, Diffie-Hellman, elliptic curve protocols, etc. It can be provided in binary form, hex form, decimal form or in any other number base. An implementation can convert the form of the cryptographic key from one base to another. For example, an implementation can convert a key represented in base 2 (binary) into a form represented in base 10 (decimal). A first portion of the cryptographic key can be sent (transmitted, displayed, etc.) over a secure channel. The secure channel can include a communications link that protects the confidentiality of all or part of the cryptographic key. For example, a secure channel can implement a communications protocol such as SSL, TLS to protect the confidentiality of information transmitted on the channel. Likewise, a secure channel can include an "air gap." For example, a portion of the cryptographic key can be displayed on a first device to a user, who then can enter it into a second device using a keypad. The shown portion of the cryptographic key can be protected because only the user may see and enter the portion. Another example of a secure channel that is an air gap is the communication channel between a user and an Automatic Teller Machine (ATM) when the user enters the user's Personal Identification Number (PIN) using a keypad at the ATM to access the user's financial account. A secure channel can also comprise an automatic image recognition system on the second device having a sensor (such as a camera) that is exposed to the display of the first device as it shows a portion of the cryptographic key. For example, the portion may be encoded in a bar code or other graphic that is shown on the display on the first device. A display in accordance with implementations can be a limited output display. A limited output display can be a display that does not have the capability to show all portions of the cryptographic key at the same time. An implementation can include a display that has the capability to display the entire key (or even more) at the same time, but does not do so.

A command to send (e.g., transmit, display, etc.) a second portion of the cryptographic key can be received over a non-secure channel. A non-secure channel can include a communications channel that does not protect the confidentiality of all or part of the cryptographic key. Examples of a non-secure channel include certain communication channels that use Ethernet or wireless mesh network protocols without encryption or other confidentiality-protecting techniques. The second portion of the cryptographic key can be the next sequence of digits of the key after the first portion, the previous sequence of digits to the first portion, or a non-sequential portion of the key.

An implementation can determine that all of the portions of the cryptographic key have been sent. If the portions were sent by showing them on a display, then the display can be cleared after the last portion is shown, or the last portion has been shown and entered, so that no portion of the key remains visible to be seen by an unauthorized person. In an implementation, the display may not be cleared until a predetermined amount of time has elapsed after the last portion of the key is displayed. This can provide the user with sufficient time to read the displayed portion and enter it into a device via a device keypad or camera or microphone. In an implementation, a command to clear the display can be generated by the user or by the user device when the user completes entering the last portion of the key into the device. The command to clear the display can be sent through the non-secure channel.

A device having an input mechanism such as a keypad or a camera can receive portions of the cryptographic key. The device can combine the portions received to constitute to cryptographic key. In an implementation, the portions can be appended to each other in order. As used herein, the term "appended" can also mean "prepended." For example, for a key that has portions A, B, C and D arranged as ABCD, the device may first receive portion A, then portion B and then portion C. As part of the process of constituting the key, the device can first append B to A to form AB, then append C to AB to form ABC. When it receives D, it may append D to ABC to produce ABCD, thereby constituting the key. Likewise, if the portions are received out of order, (say, C, B, D and A), an implementation may append B to C to form BC, then append D to form BCD and then append A to form the key ABCD. The portions may come in any order and can be combined in the correct order at the device (or elsewhere) to constitute the key or a key precursor. As used herein, the term "key" can encompass a cryptographic key or a key precursor that can be further processed to generate a cryptographic key. Once all of the portions of the key are received, a command can be sent to clear the display of the sender. Likewise, if the sender is an intermediate between the originator of the key and the intended recipient, a command can be sent to zero the memory locations at the sender that store all or part of the key.

A cryptographic key precursor can be processed to constitute the cryptographic key. For example, the received portions can be hashed, encrypted, scrambled, augmented (e.g., with a nonce), etc. to form the cryptographic key.

In accordance with implementations of the disclosed subject matter, a portion of a cryptographic key can be conveyed through a secure channel, while prompts to convey another portion (the next portion) can be sent through a non-secure channel. Once received, the key can be used to secure communications between the user device and another entity, such as a gateway and/or one or more nodes on a home network. For example, the key can be originated and the portions can be sent by a node on a home network. The key can be entered by a user at a different home network node, a mobile device such as a smartphone, a home network gateway, etc. The key can be entered using a keypad, by showing the display of a mobile device (such as a smartphone or tablet) that is showing a representation of the key (such as a barcode, a set of characters or some other graphic) to a camera that can be associated with another device. Likewise, the key can be provided to another device through an audio signal generated by the sender of the key and received by a microphone associated with the device receiving the key. The key can be shared in various implementations over secure channels with and among other devices. The key can also be originated by a gateway on a home network or by a remote server and sent a portion at a time over a secure channel to the recipient.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A computer-implemented method for providing a cryptographic key having a plurality of portions, comprising:
   sending a first portion of the cryptographic key over a secure channel, from a first home automation device in a home automation network, to a second device distinct from the first device,
   wherein the sending of the first portion of the cryptographic key from the first device to the second device comprises displaying the first portion to a user through a limited output display of the first device, to allow the user to enter the first portion into the second device through a keypad of the second device;
   clearing the display after displaying the first portion of the cryptographic key;
   receiving over a non-secure channel, by the first device from a third device different than the second device, a command to provide a second portion of the cryptographic key;
   sending over the secure channel, from the first device to the second device, the second portion of the cryptographic key,
   wherein the sending of the second portion from the first device to the second device comprises displaying the second portion to the user through the display, to allow the user to enter the second portion into the second device through the keypad; and
   determining that all of the plurality of portions of the cryptographic key have been sent.

2. The method of claim 1, further comprising generating the cryptographic key.

3. A computer-implemented method for receiving a cryptographic key having a plurality of portions, comprising:
   receiving, through a secure channel, a first portion of the cryptographic key from a first home automation device in a home automation network, wherein the receiving of the first portion comprises receiving the first portion at a second device, distinct from the first device, through a user-operated keypad of the second device after the first portion has been displayed to the user on a limited output display of the first device;
   storing, by a computing device, the first portion of the cryptographic key in a computer-readable storage;
   receiving a second portion of the cryptographic key at least partially through the secure channel,
   wherein the receiving of the second portion comprises receiving the second portion through the keypad from the user, after the second portion has been displayed to the user;
   combining the second portion of the cryptographic key with the first portion of the cryptographic key;
   sending, by the computing device, over a non-secure channel, a command to display over the secure channel a third portion of the cryptographic key;
   sending, over the non-secure channel, an indication that all of the cryptographic key has been received; and
   sending over the non-secure channel a command to clear the display.

4. The method of claim 3, further comprising initializing a cryptographic key store to zero.

5. The method of claim 3, wherein the combining the second portion of the cryptographic key with the first portion of the cryptographic key comprises appending the second portion of the cryptographic key to the first portion of the cryptographic key.

6. A system comprising:
   in a home automation device in a home automation network, a memory for storing a cryptographic key having a plurality of portions; and
   a processor connected to the memory, the processor configured to:
      send over a secure channel, to a first remote device distinct from the home automation device, a first portion of the cryptographic key,
      wherein the sending of the first portion of the cryptographic key to the first remote device comprises displaying the first portion to a user through a limited output display of the home automation device, to allow the user to enter the first portion into a keypad of the first remote device;
      clear the display after displaying the first portion of the cryptographic key;
      receive, over a non-secure channel from a second remote device, a command to display a second portion of the cryptographic key;
      send over the secure channel the second portion of the cryptographic key,
      wherein the sending of the second portion comprises displaying the second portion to the user to allow the user to enter the second portion into the first remote device through the keypad; and
      determine that all of the plurality of the portions of the cryptographic key have been displayed.

7. The system of claim 6, further comprising a display, the processor further configured to send the first portion of the cryptographic key by showing the first portion on the display.

8. A system, comprising:
   in a remote device, a memory configured to store portions of a cryptographic key;
   a processor connected to the memory, the processor configured to:
      receive a first portion of the cryptographic key through a secure channel from a home automation device, distinct from the remote device, in a home automation network,
      wherein the receiving of the first portion comprises receiving the first portion through a user-operated keypad of the remote device, after the first portion has been displayed to the user on a limited output display of the home automation device;
      store the first portion of the cryptographic key;
      receive a second portion of the cryptographic key through the secure channel, wherein the receiving of the second portion comprises receiving the second portion through the keypad from the user after the second portion has been displayed to the user;
      combine the second portion of the cryptographic key with the first portion of the cryptographic key;
      send over a non-secure channel a command to display over the secure channel a third portion of the cryptographic key;
      determine that all of the plurality of portions of the cryptographic key have been received; and
      send over the non-secure channel a command to clear the display.

9. The system of claim 8, the processor further configured to combine the second portion of the cryptographic key with the first portion of the cryptographic key by appending the second portion of the cryptographic key to the first portion of the cryptographic key.

\* \* \* \* \*